May 31, 1932.   B. BROWNSTEIN   1,860,886
PIPE THREAD PROTECTOR
Filed Sept. 14, 1928   3 Sheets-Sheet 1
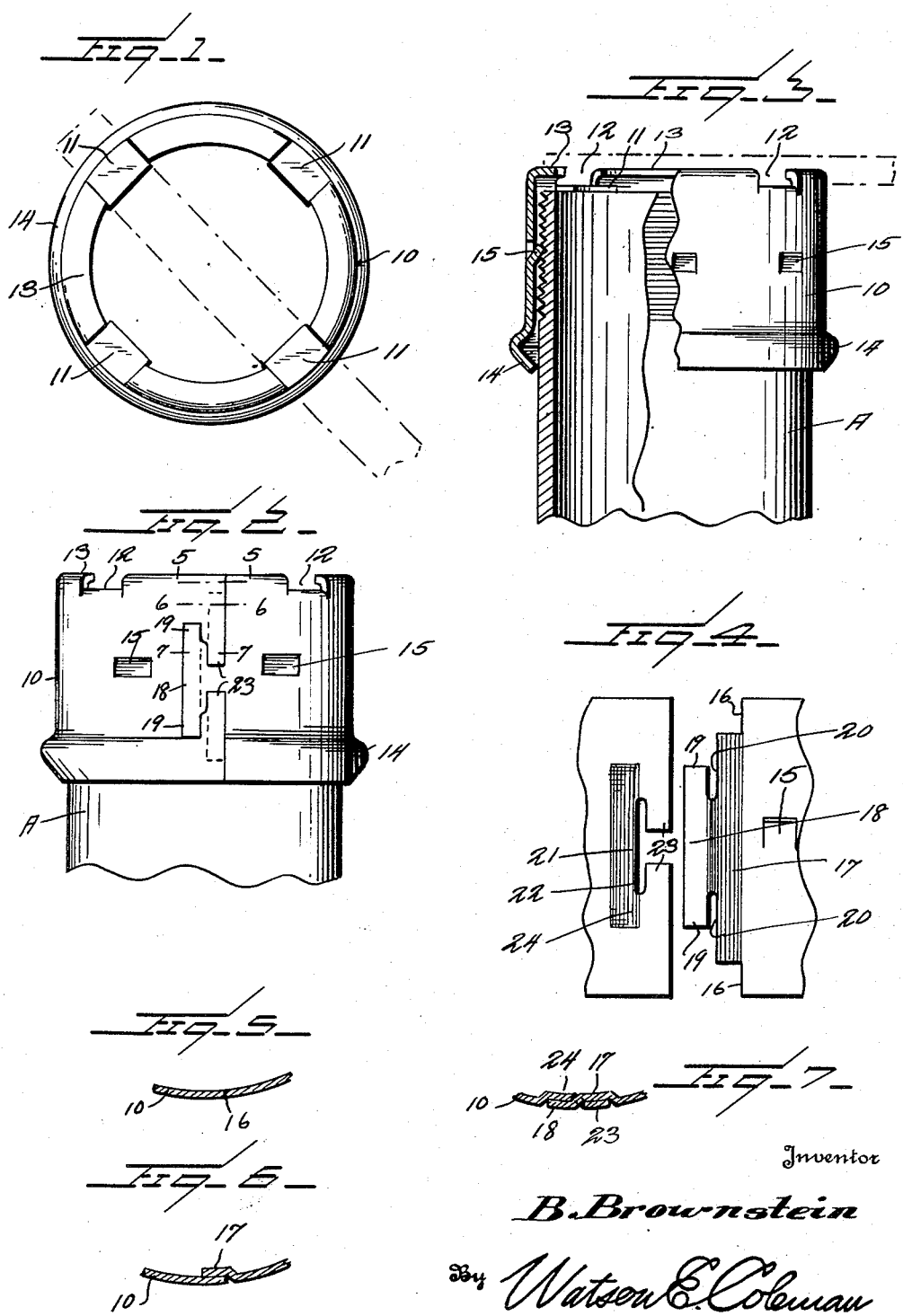

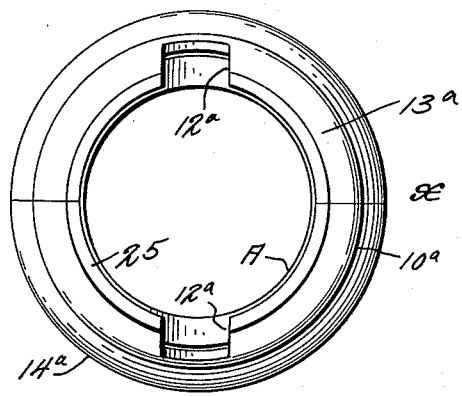
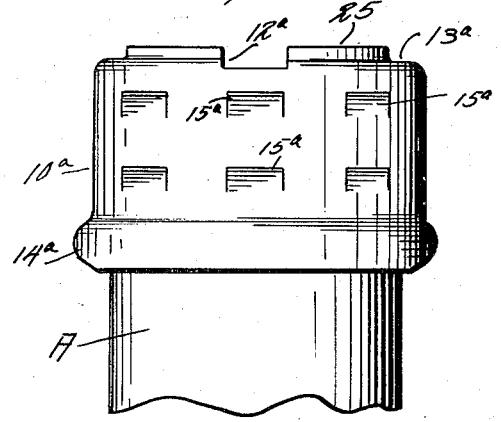
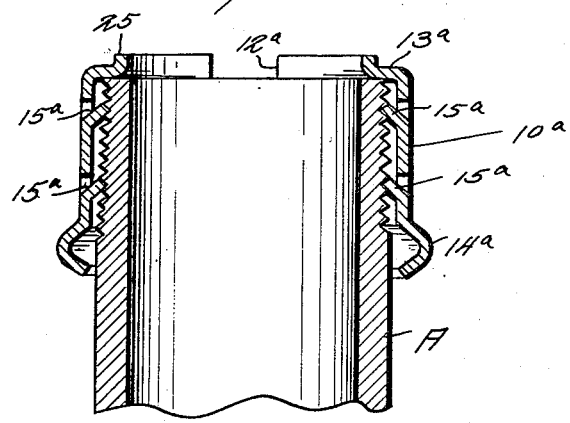

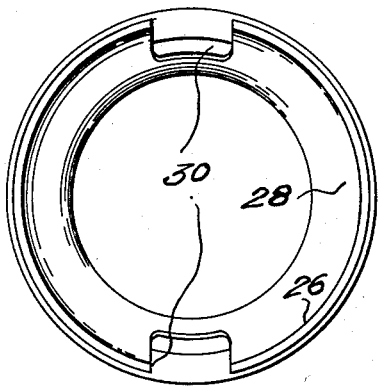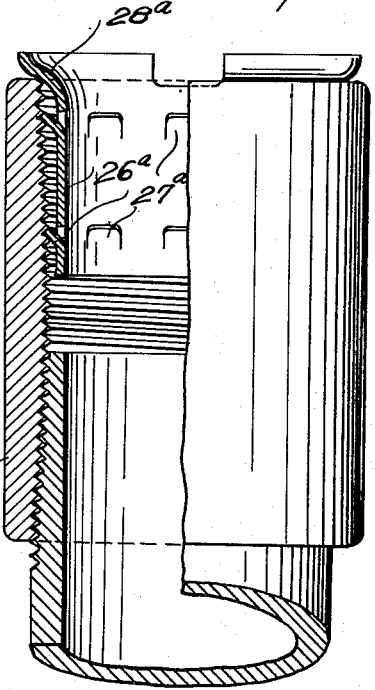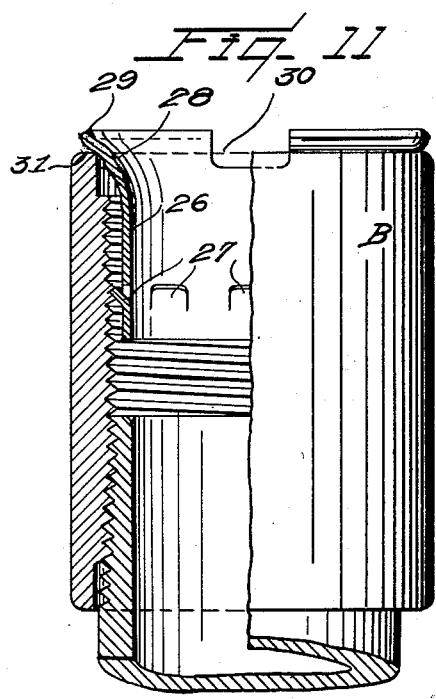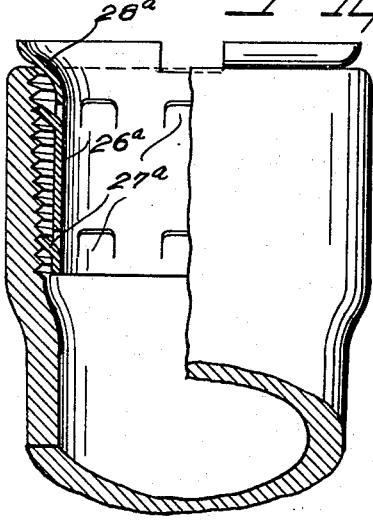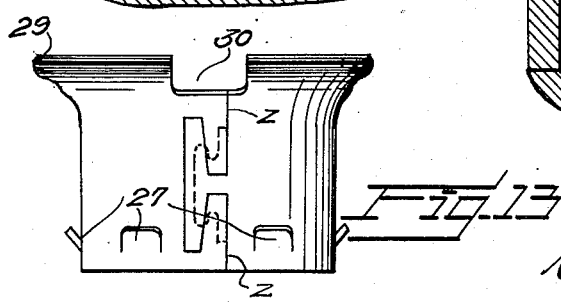

Patented May 31, 1932

1,860,886

UNITED STATES PATENT OFFICE

BENJAMIN BROWNSTEIN, OF ELLWOOD CITY, PENNSYLVANIA

PIPE THREAD PROTECTOR

Application filed September 14, 1928. Serial No. 306,020.

This invention relates to means for protecting threads on pipes and in order to fully understand the invention it must be stated that every pipe has at one end a coupling which is screwed on one end of the pipe and protects the screw threads at this end. The opposite end of the pipe, however, is sent out with a thread protector, these thread protectors being ordinarily made of half couplings or rings and threaded. The thread protectors prevent the threads from being damaged in handling or shipping and this protection is important in view of the necessity of having good tight joints in pipe lines. Where two couplings are to be used at opposite ends of the pipe to protect the threads, one of these couplings is thrown away by the users in connecting up the pipe.

The general object of the present invention is to provide a thread protector which is cheap, which is made from sheet metal in a very simple and effective manner, which does not require to be threaded, and which will fit any taper or threads of a given size and may be readily screwed on or off.

A further object is to provide a protector of this character formed of a strip or band of sheet metal initially flat, but bent around to embrace the pipe and interlocked or welded at its adjacent ends, one end of the protector being formed with an inwardly curved portion which stiffens this end of the protector and makes it stronger. This curved end of the protector is notched to form stops to bear against the end of the pipe, the notches acting as bearing supports for a wrench bar.

A further object is to form a bead at the opposite end of the protector which reinforces this end, acts as a safety spring to take up the shocks due to loading and unloading, and which, furthermore, prevents shocks from being transmitted to the threads of the pipe; this bead also acting to keep the pipe in a level position during stocking and shipping as the diameter of the bead is equal to the diameter of the coupling located at the other end of the pipe.

A further object is to so form the joint between the ends of the blank from which the protector is made that when the protector is joined and the joint compressed, the protector will have the characteristics of a solid ring with no chance of the joint shifting or breaking or coming unlocked at this point.

Another object is to so construct the protector that it may be made in three operations.

My invention is illustrated in the accompanying drawings wherein—

Figure 1 is a top plan view of a thread protector constructed in accordance with my invention, and showing in dotted lines the use of the wrench bar whereby the protector may be applied;

Fig. 2 is a side elevation of the protector shown in Fig. 1;

Fig. 3 is an elevation of a pipe and the protector thereon, a portion of the pipe and protector being in section;

Fig. 4 is an outside face view of the two adjacent ends of the protector;

Fig. 5 is a fragmentary section on the line 5—5 of Fig. 2;

Fig. 6 is a sectional view on the line 6—6 of Fig. 2;

Fig. 7 is a section on the line 7—7 of Fig. 2;

Fig. 8 is a top plan view of a protector for heavy pipe;

Fig. 9 is a side elevation thereof in position on a pipe;

Fig. 10 is a vertical sectional view through the section shown in Figs. 8 and 9;

Fig. 11 is an elevation partly in section of an internal pipe thread protector constructed in accordance with my invention;

Fig. 12 is a top plan view thereof;

Fig. 13 is a side elevation showing one manner of joining the side edges of a blank forming the protector;

Fig. 14 is a fragmentary elevation partly in section of another form of internal thread protector; and Fig. 15 shows the internal thread protector of Fig. 14 disposed within a pipe.

Referring to these drawings, it will be seen from Fig. 2 that the protector is formed from a blank 10. This blank is punched and formed in a compound die to provide at one end of the blank the inwardly directed tongues 11, which are illustrated as four in number and constitute stops, these lugs or tongues 11 extending at right angles to the plane of the blank and at right angles to the axis of the completed protector.

The bending inward of the lugs 11 leaves notches 12, four in number, disposed in diametrical relation to each other, these notches being adapted to receive a wrench bar shown in dotted lines in Fig. 3, whereby the protector may be turned on or off the pipe. The portions 13 of the metal between these notches 12 is curved inward or toward the axis of the completed protector. The opposite end of the protector, that is the opposite side edge of the blank from which the protector is made, is formed with the bead 14. This bead, as shown in Fig. 3 extends outward and then inward to a plane inward of the body 10 of the protector so as to bear against the pipe A beyond the threads thereof, shown in Fig. 3, so that the body 10 is supported above these threads.

The blank is formed with U-shaped slots at a plurality of points defining thread engaging lugs 15 having substantially the form of the lugs disclosed in my prior patent granted November 9, 1926, No. 1,606,341. These lugs extend away from the bead 14 and are adapted to engage the screw-threads on the pipe A, so that the protector may be removed from the pipe by screwing it off.

The confronting ends of the blank are formed with complementary locking members; thus one end of the blank is formed to provide the transversely extending edges 16 which extend inward from the side edges of the blank a certain distance and then the blank extending outward to form a transversely extending portion 17 which is narrower than the blank and is eventually depressed. The middle portion of the end of the blank is extended outward as at 18 to form double or opposed laterally extending tongues 19 extending from this middle portion and separated from the portion 17 by slits 20. This portion 18 is curved upward or raised eventually. The opposite end of the blank is cut out at its middle as at 21 and the inner edge of this cut out portion is laterally extended by the slits 22, thus defining two opposed inwardly extending tongues 23. In joining these ends of the blank, the portion 18 is inserted through the cut-out 21 and slits 22. Under these circumstances, the tongues 23 overlie the portion 17 while the tongues 19 overlie the portion 24 which forms the boundary of the cut-out 21. The portion 17 is depressed to permit the adjacent margin of the opposite end of the protector or blank to overlie and to permit the margins of the ends exteriorly of the portion 17 to abut against each other at 16, as shown in sectional view in Fig. 5. The portion 17, as before remarked, is depressed so as to underlie the adjacent portion of the opposite end of the blank as shown in sectional view in Fig. 6.

The portion 18 with its tongues 19 extend over the depressed portion 21 as shown by the sectional view in Fig. 7, thus the two ends of the blank are firmly interlocked with each other against any accidental separation and against any lateral movement out of proper alinement.

With this construction there is no possibility of circumferential movement of the joint when the protector is depressed. This construction makes the protector like a solid ring when the point is compressed.

The blank is punched out from a strip with the joint interlocking lugs 19 and 23, and the thread-engaging lugs 15 are bent to their proper angle. The joint interlocking lugs 19 and 23 are bent at right angles to the body of the blank and stops 11 are cut and bent at right angles to the blank while the remainder of this end of the blank is also curved in the same direction as the stops 15 at the same time the bead on the opposite side edge of the blank is partially formed. The blank is then formed into a complete ring and the joint interlocking lugs are engaged with each other and flattened out as disclosed. These operations can be performed individually or in combination and the result is a very cheap and effective thread protector. The above operations are to be carried out with dies, especially designed for this purpose and the protector is made in three operations as follows:

*First operation.*—The blank is punched and formed in a compound die of two-stage operation in one stroke of the press, punching and forming the joint interlocking lugs, the thread engaging lugs, the stops, and curving one end of the blank and forming the bead at the opposite end of the blank.

*Second operation.*—Forming the blank into a complete ring by two half-ring dies working over a mandrel.

*Third operation.*—Flattening the joint interlocking lugs over a mandrel completing the protector.

It will be seen that by my construction, I provide a protector which is thoroughly effective in all respects, which may be made of thin sheet metal, as for instance strip steel and formed in to its proper shape by dies in three very simple operations.

The protector is reenforced at one end by the inwardly curved margin 13 and at the other end by the bead, and this bead not only reenforces this end of the pipe, but acts as a safety spring, taking the shocks that are caused by the pipes striking one another during stacking or loading or unloading. Inasmuch as this bead engages the pipe at a point on the pipe where there are no threads, the shock on the bead is transmitted to the pipe at a point where no damage can be done.

This bead further keeps the pipe in a level position during stacking and shipping.

In my protector the stops 11, while they prevent the end of the pipe from extending beyond the safety zone, also provide slots for a wrench bar. The metal of the slots acting alone as bearing supports for the wrench bar is not rigid enough to withstand the strain produced by the wrench bar without buckling, hence in order to reinforce the protector at this point, I turn the end of the protector inwardly producing a stronger section and giving a stronger and more rigid abutment against which the wrench bar will bear. The joint formed by the interlocking lugs is such that it holds with even strength and prevents the ends from moving sidewise when the lugs start to bend under strain, as happens with the joint such as shown in my Patent 1,606,341, at Fig. 5. By depressing the lugs 19 and 23 as shown in section in Fig. 7, the lugs are prevented from bending under strain, and so long as the lugs do not bend the joint is safe and the lugs must shear before the joint will break.

With the metal at the end portions of the joint, that is, at the margins of the protector abutting and the remainder of the joint complementarily depressed, a simple and very effective joint is produced.

In Figs. 8, 9 and 10 I have illustrated another form of thread protector which is particularly designed for use with heavy pipe such as heavy casing and drill pipe, twenty-eight feet to thirty feet or more in length. This protector is also made of steel and is formed initially as a steel strip to provide the body 10a, the blank being bent into a circle and welded at X. The steel strip is punched to provide the thread engaging lugs 15a which have the same character as the lugs 15 in Figs. 1 to 3, and one end of the blank is bent inward as at 13a to constitute a stop which is adapted to bear against the end of the pipe A and limit the extent to which the protector may be forced upon the pipe.

The opposite end of the protector is beaded as at 14a in the same manner as heretofore described for the bead 14, thus the opposite ends of the protector are deformed so as to secure rigidity and the bead 14a has all the functions of the bead 14 previously described. The inwardly extending portion 13a is provided with an outward projecting flange 25 which also assists in rendering this end of the protector rigid and this flange is slotted as at 12a for the engagement of a wrench bar to screw the protector on or off. This outwardly turned flange 12a provides ample bearing surface for the wrench bar and stiffens this end of the protector so that it will not buckle under strain produced by the wrench bar. The blank, as before stated, is stamped and bent into a circle and the two ends of the blank are electrically welded at the point X. By this method a solid ring is provided of rigid construction and such protector may be used for very heavy pipe. This protector is also made in three operations: The first and second operations are similar to the operations for the protector shown in Figs. 1 and 2, and in the third operation the joint is electrically welded.

My thread protectors are made from steel which is from one-sixteenth to three-sixteenths inch thick, depending upon the size of the pipe. All weak spots have been eliminated so that it will stand hard usage and the strain due to the shocks which it receives when loading or unloading or stocking in the warehouse or field.

After the pipe is tested the protector is put on the pipe and the pipe is then rolled along the skids and dropped into cradles where the pipe is gathered into bundles and from there lifted by a crane and loaded into cars or stocked for future shipment.

When the bundles of pipe are dropped into cradles and when they are piled on top of one another the shock produced by their weight as they drop is received by the coupling on one end of the pipe and by the thread protector at the other end of the pipe. Thus it will be seen that the protector must be able to stand as much shock as the relatively heavy coupling. These shocks are received by the protector every time that the pipe is lifted and dropped or even lowered relatively gently.

It is to be particularly noted that no metal is cut away from around the thread engaging lugs, but that these lugs 15 fit the recesses or openings from which they are struck out. This makes the thread engaging lugs very rigid as they have a tight fit on the sides and are therefore able to withstand the load and shock required of a protector. I make one, two, or more rows of thread engaging lugs 15 or lugs 11 as is required by the size and weight of the pipe.

In Figs. 11 to 15, I illustrate an internal pipe thread protector adapted to be applied to couplings or to pipe. The protector as shown in Fig. 11 and designated 26, is made from a strip of steel formed into a ring with thread engaging lugs 27. One end of the protector is formed with an upwardly turned bell-shaped flange 28 which, at its extremity turns in reverse direction as at 29 and is notched at 30 for the reception of a wrench bar. This portion 28 is formed with a seat 31 against which the end of the coupling engages. The outwardly turned flanges provide rigidity for the protector and a firm bearing for the wrench bar when a great force is applied to the bar to turn the coupling.

The strip of steel forming the protector 26 may be longitudinally welded in the same manner as the protector shown in Fig. 8 is welded, or the ends of the strip may be engaged with each other by an interlocking joint as shown in Fig. 13, and of the same general type as that disclosed in Fig. 2. Inasmuch as the joint shown in Figs. 2 and 4 has been fully described, it is not believed necessary to redescribe this joint, suffice it to say that the ends of the strip at the points Z abut against each other, thus making the protector like a solid ring when it is compressed by an act of threading it into the coupling.

I do not wish to be limited to any particular form of joint at the ends of the metallic strip except as defined in the appended claims.

In Fig. 14, I have illustrated another form of protector for pipe couplings designated 26a, which is constructed in the same manner as the coupling shown in Fig. 11, except that since the coupling A, which is a standard pipe coupling, has no recess in its ends as has the coupling B in Fig. 11, the flange 28a of the protector is not formed to bear against or in the coupling, but two sets of thread engaging lugs 27a are provided, one set located near the flange to provide the necessary bearing within the coupling.

In Fig. 15, I have illustrated the same protector as applied to a pipe to protect the internal threads thereof. The number of thread engaging lugs in a row and the number of sets of these engaging lugs will be varied to suit the size and kind of pipe and coupling. The number of slots in the flange for the wrench bar will be varied for the same reason.

These protectors are made by similar operations to those described for the formation of the exterior pipe protector shown in Figs. 1 to 10. The electrically welded joint protectors are made in the same manner as the split ring type, except that the interlocking lugs are omitted when the joint is welded in an electric butt-welding machine.

These internal pipe thread protectors are necessary because in the handling of individual pipe in the field, a bar or hook is inserted in the end of the pipe and coupling and the pipe is lifted and transferred to where it is wanted, or when the pipe is rolled on skids, a crank bar with a slotted end in which the pipe or coupling is inserted is used. This manner of handling pipe tends to injure the thread of the pipe or coupling and many consumers demand that the manufacturers furnish internal thread protectors for these couplings and for pipe as they do external thread protectors. As will be seen from Figures 14 to 15, the outwardly flared extremity of the protector bears against the end of the pipe or the extremity of the pipe coupling so that no pressure bears upon the teeth when hooks are used in handling this pipe or when, as in the case in handling very heavy pipe, bars are inserted through the pipe and the sections of pipe are lifted. These sections of pipe weigh from one thousand pounds to two thousand pounds apiece. Oftentimes, then, the couplings for the threads are easily mashed or deformed. By my construction, the bearing of the protector is on the extremity of the pipe or on the extremity of the coupling. When bars are used for lifting these pipes, the bars are inserted at the place beyond the coupling and then the outer portions of the bars bear against the protector which in turn bears against the extremity of the coupling or the pipe so that there is no contact between the lifting bar and the pipe threads. This, from a practical point of view, is very important as, if the threads are deformed, the coupling must be removed and a new coupling put in place.

It will be seen that in all three forms of my invention as embodied in Figs. 2, 10 and 11, the bending over or flanging either outward or inward of the material forms a stop limiting the extent to which the protector may be screwed into the pipe or coupling. In Fig. 2 only a portion of the material at 12 is inwardly bent to constitute this stop, or in other words, this material at 12 is bent a little further than the main body of the flange. This, in Fig. 2, is in order to provide for a projection of a portion of the material (on each side of the inwardly bent lugs 12) to engage the wrench bar. This projection is taken care of in Figs. 10 and 11 by rebending the flange axially so that there is a portion projecting beyond the end of the pipe.

What I claim is—

1. A thread protector for pipes formed of a strip of sheet metal bent into a circle and having its ends connected, one end of the protector being transversely slitted to define a plurality of stops extending inward at right angles to the axis of the protector, the metal between said slits extending beyond the stop and then inwardly, the opposite end of the protector being formed with a bead, the body of the protector having inwardly extending pipe engaging lugs.

2. A thread protector for pipes formed of a sheet metal strip bent into a circle, the side margins of the strip being abutted against each other, the metal inward of the side margins at the ends of the strip being overlapped and the ends of the strip being formed with two pairs of transversely extending interlocking tongues extending in opposite directions, the overlapping portions of the metal and the tongues being compressed into each other to anchor the ends of the strip rigidly to each other, one end of the protector being formed with a plurality of pairs of transversely extending slits, the material defined by said slits being inwardly bent at right angles to the axis of the protector to form stops, the material between said stops at this end of the protector extending beyond the stop and then being inwardly curved whereby to define recesses for receiving a wrench bar, the opposite end of the protector being formed with a circumferential bead, the outer end of which extends inward towards the inner face of the body of the protector, the body of the protector being provided with inwardly extending lugs to engage the threads on the pipe.

3. A thread protector for pipes formed of a sheet metal strip bent into a circle, the ends being abutted against each other and connected, one end of the protector being bent to overlie the end of a pipe and this end of the protector being recessed at diametrically opposite points to receive a wrench bar, the opposite end of the protector being formed with a circumferential bead, the body of the protector having longitudinally inclined resilient lugs to engage the threads on the pipe.

In testimony whereof I hereunto affix my signature.

BENJAMIN BROWNSTEIN.